United States Patent [19]

Obara

[11] Patent Number: 4,649,252
[45] Date of Patent: Mar. 10, 1987

[54] WIRE-CUT ELECTRIC DISCHARGE MACHINING METHOD

[75] Inventor: Haruki Obara, Sagamihara, Japan

[73] Assignee: Fanuc Limited, Minamitsuru, Japan

[21] Appl. No.: 529,225

[22] Filed: Sep. 1, 1983

Related U.S. Application Data

[63] Continuation-in-part of Ser. No. 204,273, Nov. 5, 1980, abandoned.

[30] Foreign Application Priority Data

Nov. 9, 1979 [JP] Japan ................. 54-145237

[51] Int. Cl.[4] .............................................. B23H 7/06
[52] U.S. Cl. ............................ 219/69 W; 219/69 C; 219/69 M
[58] Field of Search .............. 219/69 M, 69 W, 69 V, 219/68, 69 R, 69 C; 204/206, 224 M

[56] References Cited

U.S. PATENT DOCUMENTS

| | | | |
|---|---|---|---|
| 3,578,937 | 5/1971 | Sennowitz | 219/69 P |
| 3,671,705 | 6/1972 | Raznitsyn | 219/69 W |
| 3,809,848 | 5/1974 | Bell, Jr. | 219/69 P |
| 4,104,502 | 8/1978 | Ullmann et al. | 219/69 M |
| 4,242,555 | 12/1980 | Delpretti | 219/69 M |
| 4,324,970 | 4/1982 | Nanasawa et al. | 219/69 W |

FOREIGN PATENT DOCUMENTS

| | | | |
|---|---|---|---|
| 2502288 | 8/1976 | Fed. Rep. of Germany | 219/69 W |
| 2914368 | 10/1979 | Fed. Rep. of Germany | 219/69 W |
| 2942202 | 9/1980 | Fed. Rep. of Germany | 219/69 W |
| 136797 | 11/1978 | Japan | 219/69 W |
| 20496 | 2/1979 | Japan | 219/69 W |
| 56-39830 | 4/1981 | Japan | 219/69 W |
| 114621 | 9/1981 | Japan | 219/69 W |

Primary Examiner—A. D. Pellinen
Assistant Examiner—Geoffrey S. Evans
Attorney, Agent, or Firm—Staas & Halsey

[57] ABSTRACT

A wire-cut electric discharge machining system is provided with a high-current, short-pulse discharge circuit for producing a high-current, short-pulse discharge between a wire and a workpiece, a low-current, pulse discharge circuit for producing a low-current, pulse discharge between the wire and the workpiece, and a control unit to alternately use both discharge circuits and to control the relative movement of the wire with respect to the workpiece. Main cutting along a predetermined path by the high-current, short-pulse discharge circuit is followed by at least one second cutting along a path adjacent the main cutting path by the low-current, pulse discharge circuit for each predetermined section, thereby performing electric discharge machining of the workpiece at an overall reduction of time.

16 Claims, 8 Drawing Figures

WIRE-CUT ELECTRIC DISCHARGE MACHINING METHOD

CROSS-REFERENCE TO RELATED APPLICATION

This is a continuation-in-part of copending application, Ser. No. 204,273, filed Nov. 5, 1980, now abandoned.

BACKGROUND OF THE INVENTION

1. Field of the Invention

The present invention relates to a wire-cut electric discharge machining system, and more particularly to a wire-cut electric discharge machining system in which a main cutting by a high-current, short-pulse discharge is combined with a second cutting by a low-current, pulse discharge.

2. Description of the Prior Art

A wire-cut electric discharge machine has various advantages, such as requiring no special operator skills to accurately cut a metal mold or the like having a complicated shape and, since the electrode for the electric discharge cutting is a wire, there is no need to manufacture a working electrode with some required configuration, as is needed in ordinary discharge machines. On account of these advantages, the wire-cut discharge machine has very wide application, but this machine has a drawback in that the cutting speed is low. In order to increase the cutting speed, the machine has undergone various improvements. In general, for raising the cutting speed, increasing the discharge frequency per unit time or the efficiency of one discharge can be considered, but the prior art employs a high-current, short-pulse discharge in many cases. Accordingly, it is unavoidable that the machined surface is degraded and becomes rough.

To improve the degraded surface roughness resulting from the main cutting, it is general practice in the art that the main cutting by the high-current, short-pulse discharge method is followed by a second cutting for cutting the machined surface by a low-current, pulse discharge at high speed. With this method, it is possible to obtain excellent surface roughness, comparable to the case of employing low-speed cutting by the low-current pulse discharge from the beginning. In the prior art, however, the second cutting takes place independently of the main cutting and, for example, in the case of die cutting, it is necessary to remove a scrap slug after the main cutting and re-set the cutting conditions for the second cutting, and in the case of punch cutting, it is necessary to perform the main cutting, leaving two or three portions of the machined area uncut, and carry out the second cutting after the main cutting. Accordingly, the main and the second cutting operations must be effected separately; this complicates operation and makes it impossible to automate the wire-cut electric discharge machine.

SUMMARY OF THE INVENTION

It is an object of the present invention to provide a wire-cut electric discharge machining system which permits the reduction of the overall cutting time.

Another object of the present invention is to provide a wire-cut electric discharge machining system which is designed so that the main cutting by a high-current, short-pulse discharge and the second cutting by a low-current, pulse discharge are performed in parallel during one operation.

Briefly stated, the wire-cut electric discharge machining system of the present invention is provided with a high-current, short-pulse discharge circuit for producing a high-current, short-pulse discharge between a wire and a workpiece, a low-current, pulse discharge circuit for producing a low-current pulse discharge between the wire and the workpiece, and control means for alternately using both discharge circuits and for controlling the relative feed of the wire and workpiece. The main cutting by the high-current, short-pulse discharge circuit and at least one second cutting by the low-current, pulse discharge circuit are performed for each predetermined section, thereby to effect electric discharge machining of the workpiece. The relative feed rate of the wire and the workpiece in the second cutting is several to several tens of times that in the main cutting and, in addition, the main and the second cutting can be performed by one operation; accordingly, the overall cutting time is reduced as compared with the prior art.

DESCRIPTION OF THE PREFERRED EMBODIMENTS

Figure 1:
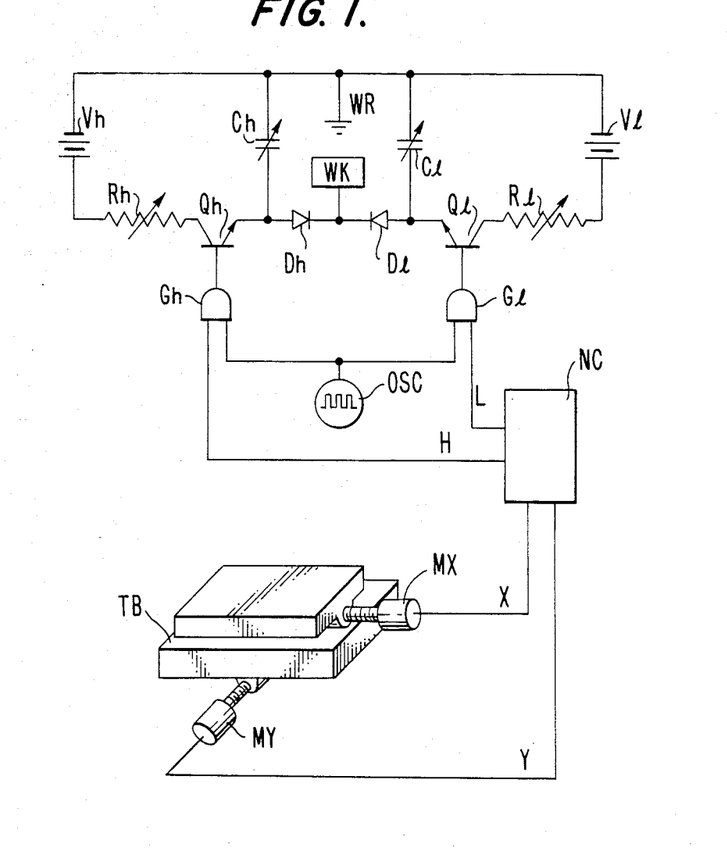
FIG. 1 is a block diagram illustrating the principal part of a wire-cut electric discharge machine embodying the present invention.

In FIG. 1, reference characters $V_h$ and $V_l$ indicate power source; $R_h$ and $R_l$ desigate resistors; $Q_h$ and $Q_l$ identify switching elements such as transistors or the like; $C_h$ and $C_l$ denote capacitors; $D_h$ and $D_l$ represent diodes; WR shows a wire; WK refers to a workpiece; $G_h$ and $G_l$ indicate AND circuits; OSC designates an oscillator; NC identifies a numerical control unit; TB denotes a table for supporting the workpiece WK; and MX and MY represent X-axis and Y-axis motors.

The power source $V_h$, the resistor $R_h$, the capacitor $C_h$, the diode $D_h$ and the switching element $Q_h$ constitute a high-current, short-pulse discharge circuit for the main cutting. The power source $V_l$, the resistor $R_l$, the capacitor $C_l$, the diode $D_l$ and the switching element $Q_l$ make up a low-current, pulse discharge circuit for the second cutting. Both discharge circuits supply discharge energy between the wire WR and the workpiece WK. In the illustrated embodiment, both discharge circuits employ a transistor-capacitor charge and discharge circuit, which may, however, be substituted with some other discharge circuits capable of delivering the discharge energy. Both discharge circuits respectively operate on drive pulses which are applied from the oscillator OSC to the gates of the switching elements $Q_h$ and $Q_l$, and these discharge circuits are selectively activated by opening or closing the AND circuits $G_h$ and $G_l$ by select signals H and L derived from the numerical control unit NC.

Further, the numerical control unit NC provides pulses X and Y to the X-axis and Y-axis motors MX and MY to control the feed of the table TB, moving the wire WR and the workpiece WK relative to each other. The illustrated example employs two-axis control, but in the case of tappering, use is made of three-axis (X, Y, Z) or four-axis (X, Y, U, V) control.

Figure 2:
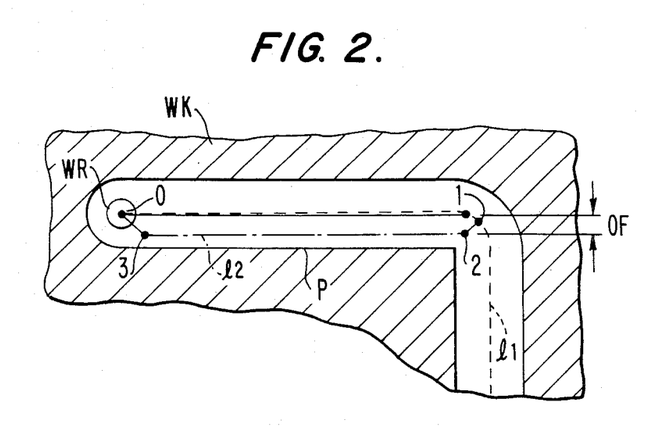
FIG. 2 is a schematic diagram showing an example of a cutting path, explanatory of the operation of the machine illustrated in FIG. 1.

FIG. 2 shows an example of a cutting path, explanatory of the operation of the discharge machine depicted in FIG. 1. In FIG. 2, reference character WR designates a wire electrode; WK designates a workpiece; P identifies a required wall surface; $l_1$ denotes a main cutting path; $l_2$ represents a second cutting path; 0 to 3 show various positions; and OF refers to an offset. Next, a description will be given, with reference to FIG. 2, of the operation of the discharge machine illustrated in FIG. 1.

At first, the numerical control unit NC applies the select signal H to the AND circuit $G_h$ to open it, through which the output pulses from the oscillator OSC are provided to the switching element $Q_h$ to activate the high-current, short-pulse discharge circuit. At the same time, the numerical control unit NC provides the pulses X and Y to the X-axis and Y-axis motors MX and MY to feed the wire WR and the workpiece WK relative to each other, performing the discharge machining of the workpiece while moving the wire WR along the main cutting path $l_1$, as shown in FIG. 2. When the main cutting reaches the predetermined position 0, the numerical control unit NC stops the feed of the wire WR to discontinue the main cutting and moves the wire WR back along the path $l_1$ to the position 1 at a high speed which is several to several tens of times the speed in the case of the main cutting.

Next, the numerical control unit NC moves the wire WR along a path 1→2 until the commanded offset OF is reached and, when the wire WR reaches the position 2, the numerical control unit NC applies the select signal L to the AND circuit $G_l$ to open it and thereby operate the low-current pulse discharge circuit. At the same time, the cutting path is changed over to the second cutting path, along which the wire WR is moved to cut the required wall surface P of the work. When the wire WR reaches the position 3, the cutting path moves from the position 3 to the position 0 and the high-current, short-pulse discharge circuit is activated again to return the wire WR to the position 0 where the main cutting was discontinued previously, and then the next cutting is started. The feed rate of the wire WR in the path 1→2→3→0 is also several to several tens of times the feed rate in the main cutting.

By repeating the above operations the main cutting and the second cutting are performed in parallel to cut the workpiece WK. In this case, switching from the main cutting to the second cutting may be effected for each block of cutting, but if the block is long, the switching may also be done for each constant distance, or the two methods may be combined.

Figure 3:
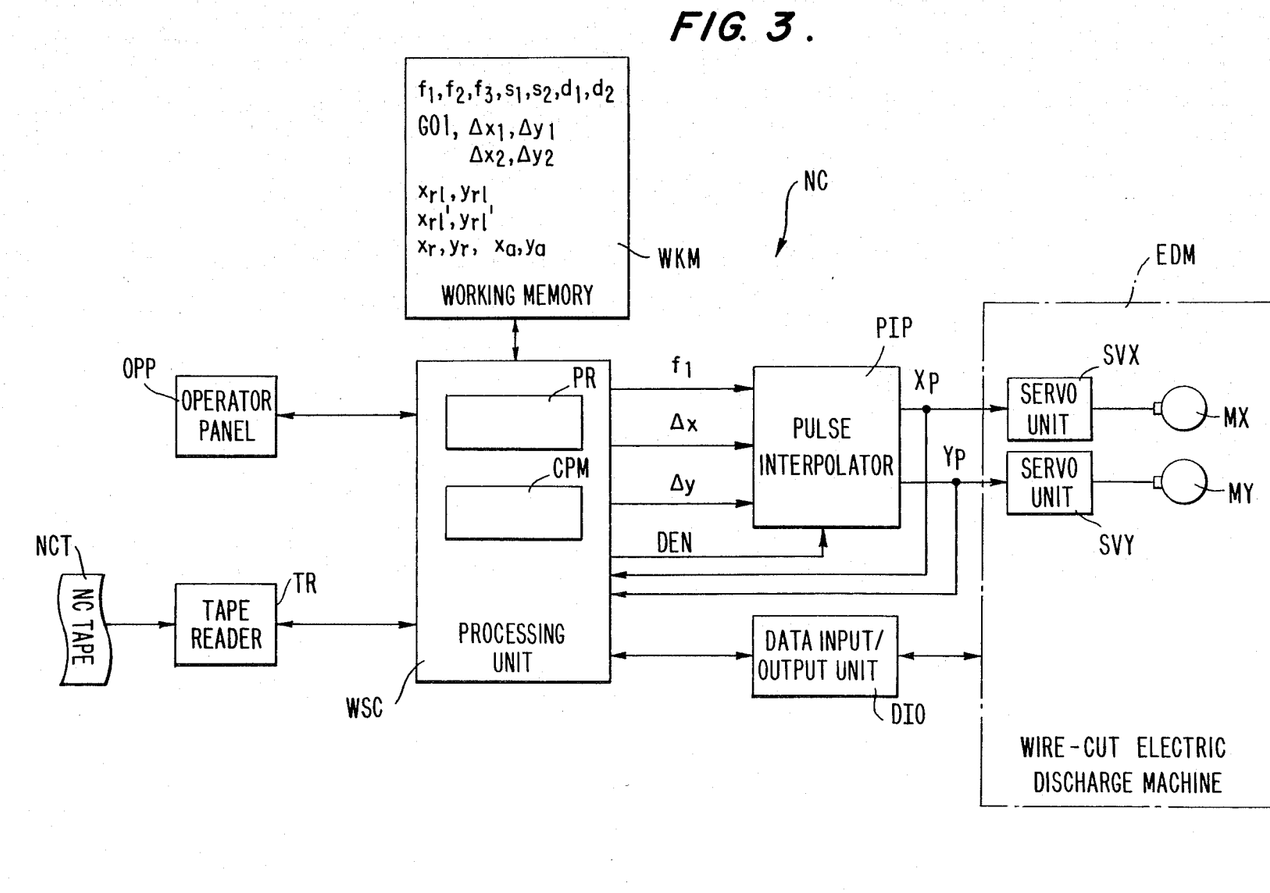
FIG. 3 is a block diagram illustrating a numerical controller.
Figure 4A:
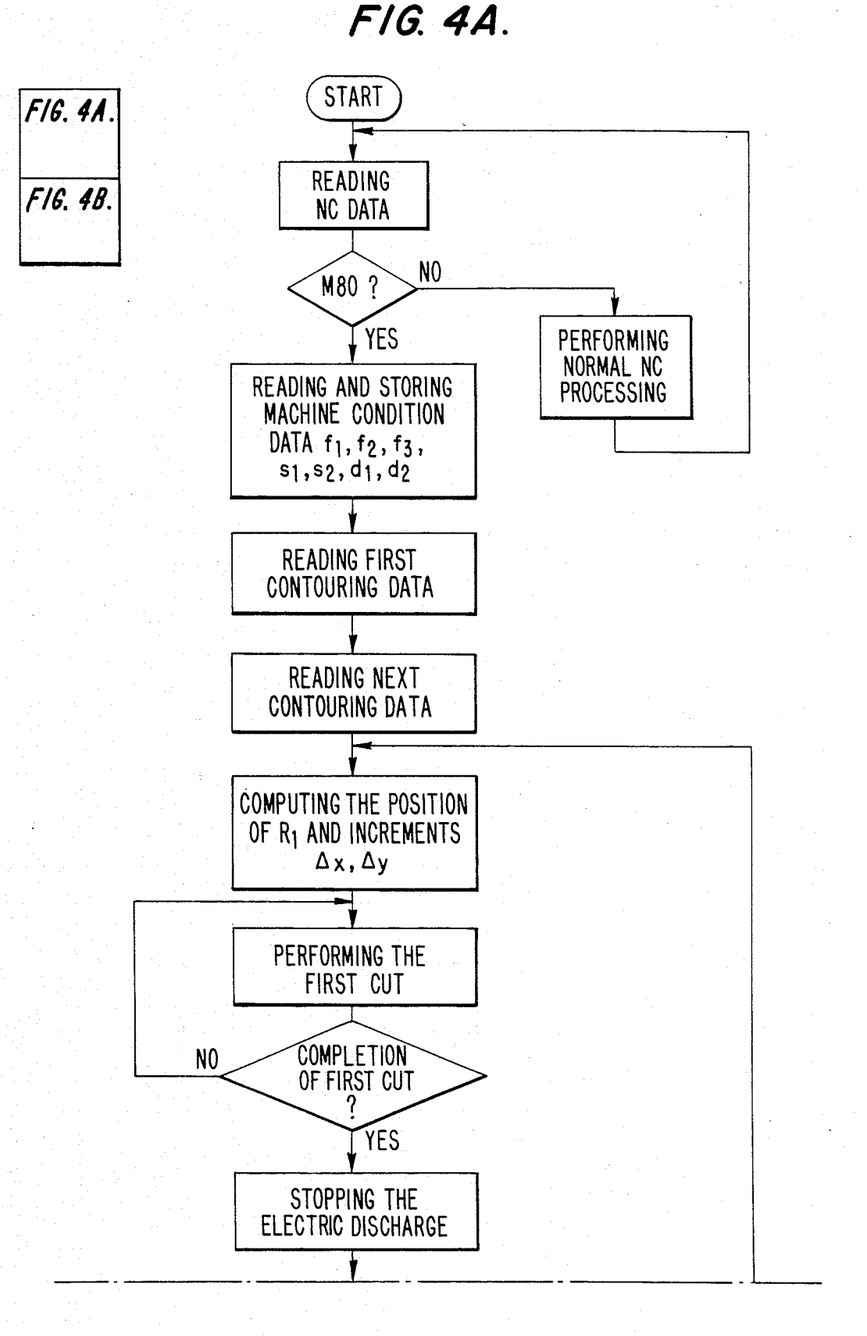
FIG. 4a and FIG. 4b, hereinafter referred to as FIG. 4, are a flowchart explanatory of the wire-cut electric discharge machining method of the present invention.
Figure 4B:
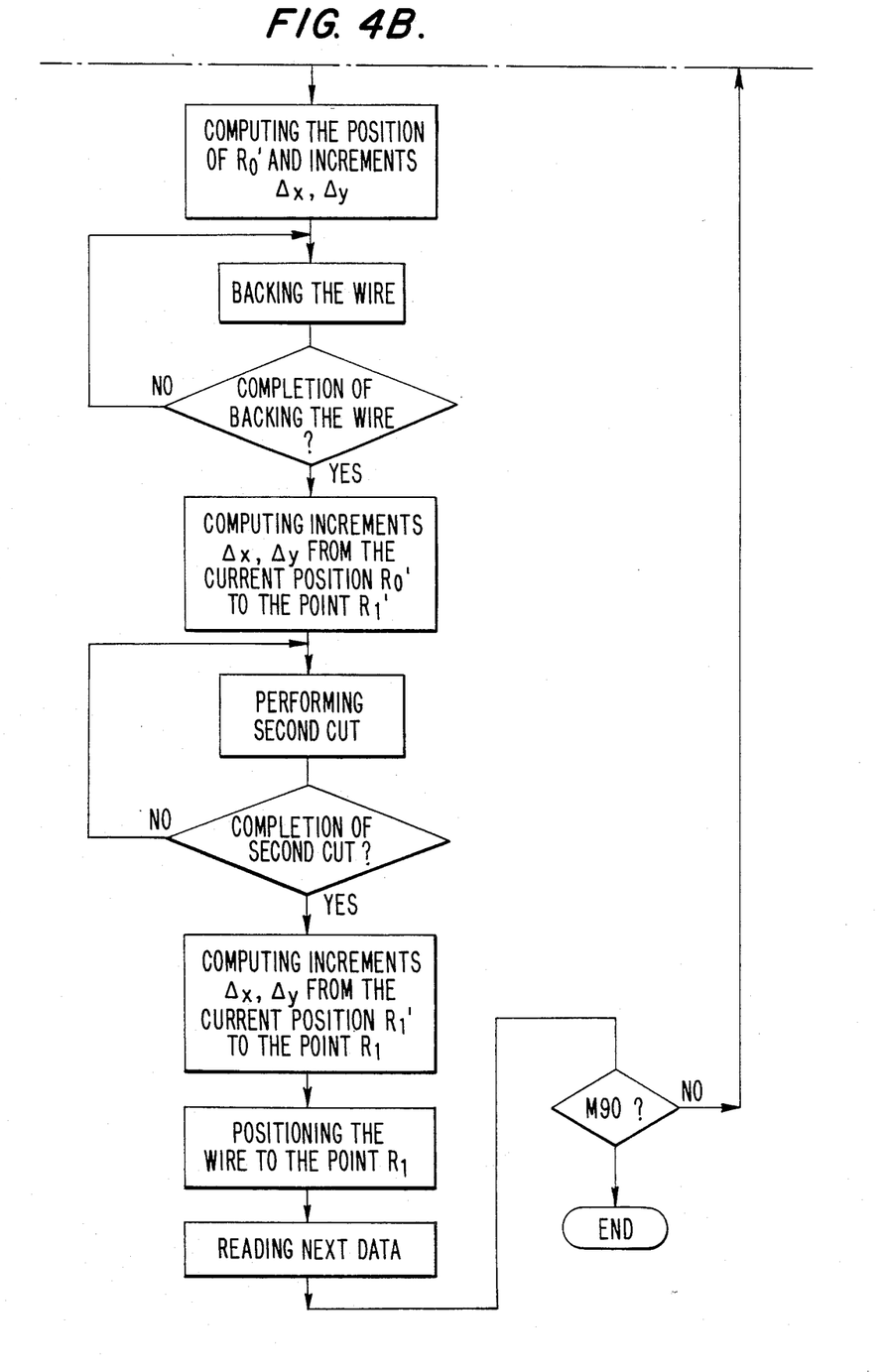
Figure 5:
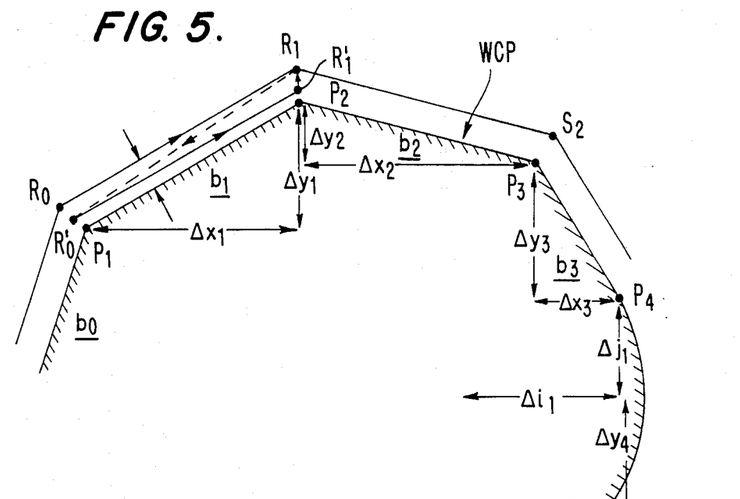
FIG. 5 is a diagram showing a cutting path, explanatory of a second cutting operation according to the present invention.

Next, a description will be given, with reference to FIGS. 3 through 6, of the second processing by the numerical controller NC. FIG. 3 is a block diagram of the numerical controller NC; FIG. 4 is a flowchart of the processing; FIG. 5 shows an example of a cutting path; and FIG. 6 is explanatory of offset processing.

An NC tape NCT has recorded thereon control data for the second cutting operation and numerical data for specifying a cutting path. Assuming, for example, that the electric discharge machining takes place along a cutting path WCP in FIG. 5 while conducting the main cutting (first cutting operation) and second cutting control for each block, NC data for the second cutting operation becomes such as follows: (In this case, let it be assumed that the second cutting starts from a point $P_1$.)

$M80;$ $F f_1, f_2, f_3 \ S \ s_1, s_2, \ D \ d_1, d_2;$ $G01 X \Delta x_1 \ Y \Delta y_1;$ $X \Delta x_2 \ Y \Delta y_2;$ $X \Delta x_3 \ Y \Delta y_3;$ $G02 \ X \Delta x_4 \ Y \Delta y_4 \ I \Delta i_1 \ I \Delta j_1;$ $M90;$ In the above NC data, the M-function command "M80" commands the execution of the second cutting operation for each block; the three numeric values $f_1$, $f_2$ and $f_3$ following the word address "F" command the feed rate for the main cutting operation and the feed rate and the wire moving-back speed for the second cutting; the numeric values $s_1$ and $s_2$ following the word address "S" command the cutting condition (for instance, the tension of the wire) in the first and the second cutting; the numeric values $d_1$ and $d_2$ following the word address "D" command the amount of wire offsetting in the first and the second cutting; the G-function command "G01" commands a straight cutting, another G-function command "G02" commands a circular arc cutting; and the M-function command "F90" commands the completion of the second cutting operation. A tape reader TR reads out the data from the NC tape NCT block by block for input to a processing unit WSC. The processing unit WSC is provided with a processor PR and a control program memory CPM, and it discerns the data read out by the tape reader TR and performs contouring control or the processing for the second cutting. That is, when supplied with the M-function command "M80", the processing unit WSC discerns it and thereafter executes wire position control so that upon each completion of one block the second cutting of the block may be conducted. Further, the processing unit WSC stores in a working memory WKM the feed rates $f_1$, $f_2$ and $f_3$, the cutting conditions $s_1$ and $s_2$ and the amounts of offset $d_1$ and $d_2$ commanded for the block next to the M-function command "M80" and, at the same time, suitably outputs to a pulse interpolator PIP the feed rate $f_1$ during the first cutting, the feed rate $f_2$ and the wire moving-back speed $f_3$ during the second cutting and, further, it properly inputs the cutting conditions $s_1$ and $s_2$ via a data input/output unit DIO to a wire-cut electric discharge machine EDM. Moreover, when supplied with contouring data, the processing unit WSC executes the offset processing based on the amount of offset and moves the wire along the commanded path.

Figure 6:
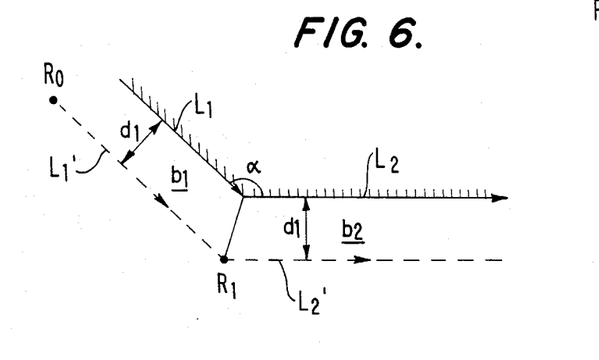
FIG. 6 is a diagram explanatory of offset processing.

Incidentally, assuming that the programmed path is comprised of two straight lines $L_1$ and $L_2$ as shown in FIG. 6, the offset processing takes place as follows. The processing unit WSC reads out a move command of a current block $b_1$ and, at the same time, pre-reads a move command of the next block $b_2$, and obtains a straight line $L_1'$ offset from the straight line $L_1$ of the current block $b_1$ by the amount of offset $d_1$ and a straight line $L_2'$ offset from the straight line $L_2$ of the next block $b_2$ by the amount of offset $d_1$, and it computes the coordinate value of an intersection $R_I$ of the straight lines $L_1'$ and $L_2'$. And, by moving the wire from a terminating point $R_O$ of a previous block to the intersection $R_I$ through pulse distribution, the wire center follows a path offset from the correctly commanded program path by the amount of offset $d_1$, conducting electric discharge machining of a workpiece as commanded.

Next, a description will be given, with reference to the flowchart of FIG. 4, of the wire-cut electric discharge machining of the present invention.

(a) A start button (not shown) on an operator panel OPP is depressed.

(b) By the depression of the start button, the processing unit WSC reads out the NC data from the NC tape NCT via the tape reader TR.

(c) The processing unit WSC checks whether the NC data is the M-function command "M80" and, if not, performs ordinary numerical control processing based on the NC data.

(d) If the NC data is the M-function command, the processing unit WSC reads out the NC data of the next block and stores in the working memory WKM the feed rates $f_1$ and $f_2$ and the wire moving-back speed $f_3$, the cutting conditions $s_1$ and $s_2$ and the amounts of offset $d_1$ and $d_2$ in the first cutting and the second cutting. Further, the processing unit WSC outputs the feed rate $f_1$ in the first cutting to the pulse interpolator PIP and outputs the cutting condition $s_1$ via the data input/output unit DIO to the wire-cut electric discharge machine EDM. Based on this cutting condition, the wire-cut electric discharge machine EDM makes preparations for the first cutting operation.

(e) Then the processing unit WSC reads out the following contouring data of two blocks from the NC tape NCT via the tape reader TR and stores the data in the working memory WKM.

G01 X $\Delta x_1$ Y $\Delta y_1$;

X $\Delta x_2$ Y $\Delta y_2$;

(f) Upon completion of the readout of the contouring data, the processing unit WSC performs the aforementioned offset processing through using the NC data stored in the working memory WKM. That is, the processing unit WSC obtains the coordinate value $(x_{rI}, y_{rI})$ of the offset point $R_I$ (see FIG. 5) and stores it in the working memory WKM and computes the increments $\Delta x$ and $\Delta y$ from the current position to the offset point $R_I$. Incidentally, the current position (Xa, Ya) is stored in the working memory WKM.

(g) The increments $\Delta x$ and $\Delta y$ are stored as remaining amounts of movement $X_r$ and $Y_r$ in a remaining amount of movement storage area of the working memory WKM, and the increments $\Delta x$ and $\Delta y$ are applied as inputs to the pulse interpolator PIP.

When supplied with the increments $\Delta x$ and $\Delta y$, the pulse interpolator PIP executes a known pulse distributing computation using the already input feed rate $f_1$ for the first cutting and generates distribution pulses $X_p$ and $Y_p$ for the X and Y axes. The distribution pulses $X_p$ and $Y_p$ are provided to X-axis and Y-axis servo units SVX and SVY to drive servo motors MX and MY. By this, a table on which a workpiece (not shown) is mounted is moved relative to the wire at the speed $f_1$. The distribution pulses $X_p$ and $Y_p$ are provided to the processing unit WSC, too. Upon each occurrence of the distribution pulses $X_p$ and $Y_p$, the processing unit WSC updates, according to the following expressions, the remaining amounts of movements Xr and Yr stored in the working memory WKM:

$$X_{r-1} \rightarrow X_r, Y_{r-1} \rightarrow Y_r$$

$$X_{a\pm 1} \rightarrow X_a, Y_{a\pm 1} \rightarrow Y_a$$

where the signs depend on the direction of movement. A pulse distribution end signal DEN is generated by $Xr=0$ and $Yr=0$, and the pulse distributing computation based on first cutting data "G01 X $\Delta x_1$ Y $\Delta y_1$;" is completed. In other words, the first cutting is completed.

(h) Upon completion of the pulse distributing computation (the first cutting operation), the processing unit WSC performs the offset processing through using the NC data and the amount of offset $d_2$ of the previous block $b_0$ and the current block $b_1$ stored in the working memory WKM to obtain an offset point $R'_O(X_{rO}, Y_{rO})$ and computes increments $\Delta X(=X_{rO}-Xa)$ and $\Delta Y(=Y_{rO}-Ya)$ from the current position $R_I$(Xa, Ya) to the offset point $R'_O$.

(i) Then the processing unit WSC outputs the wire movingback speed $f_3$ and the increments $\Delta x$ and $\Delta y$ to the pulse interpolator PIP and, at the same time, delivers a discharge stop signal via the input/output unit DIO to the wire-cut electric discharge machine EDM. The wire moving-back speed $f_3$ may also be set by a set switch on the operator panel OPP.

(j) Based on the input data $f_3$, $\Delta x$ and $\Delta y$, the pulse interpolator PIP simultaneously conducts the pulse distributing computation for the two axes in the same manner as described previously, thereby moving the wire back to the offset point $R_O'$ at the speed $f_3$.

(k) Upon arrival of the wire at the offset point $R_O'$ ($X_r=Y_r=0$), the wire moving-back control is completed and the processing unit WSC delivers the cutting condition $s_2$ via the data input/output unit DIO to the wire-cut electric discharge machine EDM, causing it to make preparations for the second cutting operation.

(l) Then the processing unit WSC performs the offset processing through using the NC data of the blocks $b_1$ and $b_2$ and the amount of offset $d_2$ stored in the working memory WKM to obtain the coordinate value $(X_{rI}',$ $Y_{rl}'$) of the offset point $R'_l$ and stores it in the working memory WKM. Further, the processing unit WSC obtains the increments $\Delta x(=X_{rl}'-Xa)$ and $\Delta y(=Y_{rl}'-Ya)$ from the current position $R_O'$ (Xa, Ya) to the offset point $R_l'$.

(m) Next, the processing unit WSC provides to the pulse interpolator PIP the increments $\Delta x$ and $\Delta y$ and the feed rate $f_2$ for the second cutting stored in the working memory WKM.

(n) Based on the input data $f_2$, $\Delta x$ and $\Delta y$, the pulse interpolator PIP carries out the pulse distributing computation for the two axes concurrently in the same manner as described previously, thereby moving the wire along a straight line $R_O'R_l'$ at the rate $f_2$ to conduct the second cutting operation.

(o) When the wire has reached the point $R_l'$ to complete the second cutting operation ($X_r=Y_r=0$), the processing unit WSC obtains increments $\Delta x(=X_{rl}-Xa)$ and $\Delta y(=Y_{rl}-Ya)$ between the coordinate value ($X_{rl}$, $Y_{rl}$) of the offset point $R_l$ stored in the working memory WKM and the current position $R_l'$ and moves the wire along a straight line $R_l'R_l$ through using the increments.

(p) Upon arrival of the wire at the point $R_l$, the first and second cutting operations are entirely completed. Then the processing unit WSC reads out NC data of the next block $b_3$ from the NC tape NCT via the tape reader TR and repeats the same operations as described above. Such second-cut control for each block is conducted until a second-cut end command M90 is read out. In the processing of the second and subsequent blocks, the coordinate value ($X_{rl}'$, $Y_{rl}'$) of the offset point $R_l'$ need not be computed since it is stored in the working memory WKM.

While in the above embodiment the first and second cutting are performed moving the wire along the path $R_o \rightarrow R_l \rightarrow R_O' \rightarrow R_l' \rightarrow R_l$, it is also possible to conduct the first and second cutting by moving the wire via a route $R_o \rightarrow R_l \rightarrow R_o \rightarrow R_O' \rightarrow R_l' \rightarrow R_l$.

Figure 7:
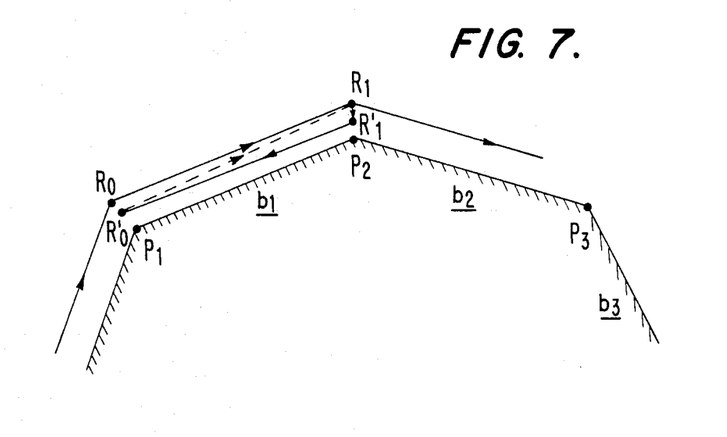
FIG. 7 is a diagram explanatory of another second cutting operation according to the present invention.

Futher, in the foregoing embodiment the wire is moved back after completion of the first cutting and thereafter the second cutting is carried out, but it is also possible to perform the second cutting while moving the wire back after the first cutting and to move the wire forward to the first cutting end point after the second cutting, followed by machining of the next block. FIG. 7 is explanatory of a wire path in such a second cut processing. The format of the NC data is identical with the format employed for the second cut processing of FIG. 5 but $f_3$ is the forward speed from the second cut end point $R_O'$ (see FIG. 7) to the first cut end point $R_1$. The method of computing the offset points $R_l$, $R_l'$ and $R_O'$ is the same as that used in the case of the second cut processing of FIG. 5. A brief description will be given of the second cut processing of FIG. 7.

(a) NC data is prepared using the instruction "M80" commanding the execution of the second cut, the feed rates $f_1$ and $F_2$ in the first and second cuts, the cutting conditions $s_1$ and $s_2$, the amounts of offset $d_1$ and $d_2$, the forward speed $f_3$, the wire contouring data for each block and the second cut end instruction "M90", and the data thus prepared is input.

(b) By the second cut instruction "M80", a path $R_OR_l$ which is offset from a commanded path of the first block by the amount of offset $d_2$ is computed using the contouring data of the first and second blocks $b_1$ and $b_2$.

(c) The first cut is conducted by moving the wire relative to the workpiece, along the path $R_OR_l$ at the feed rate $f_1$ and under the cutting condition $s_1$.

(d) After the first cut, the offset point $R_l'$ is obtained which is offset from the commanded path end point $P_2$ of the first block $b_1$ by the amount of offset $d_2$.

(e) Thereafter the wire is moved along the path $R_lR_l'$ at the feed rate $f_2$ and under the cutting condition $s_2$.

(f) After the wire has been positioned at the offset point $R_l'$, the offset point $R_O'$ is obtained which is offset from the commanded path start point of the first block $b_1$ by the amount of offset $d_1$.

(g) The second cut is performed by moving the wire relative to the workpiece along the path $R_l'R_O'$ at the feed rate $f_2$ and under the cutting condition $s_2$.

(h) After the second cut, the wire is moved forward to the first cut end point $R_l$ at the speed $f_3$ with the electric discharge stopped.

(i) Thereafter the second cut processing of the second block $b_2$, the third block $b_3$, ... is conducted until the second cut end instruction "M90" is read out.

It is preferred that the position 1 in FIG. 2 is set up a little short of the previous second cutting stopping point (corresponding to the position 3). In FIG. 2, the wire WR is brought back along the main cutting path $l_1$ from the main cutting stopping position 0 to the position 1 and then the wire WR is shifted corresponding to the offset to reach the point 2, but it is also possible to move the wire WR linearly from the position 0 to 2, changing the offset. In this case, the high-current, short-pulse discharge circuit and the low-current, pulse discharge circuit are changed over at a desired value of the offset. In the examples above, the second cutting is described as being carried out once but it may also be repeated any required number of times.

As has been described in the foregoing, according to the present invention, the main cutting and the second cutting are alternately repeated by switching the high-current, short-pulse discharge circuit and the low-current, pulse discharge circuit during cutting. Accordingly, there is no need of effecting the second cutting after completion of the main cutting as is required in the prior art, and the main cutting and the second cutting can be performed by one setting operation. Since the cutting speed of the second cutting is several to several tens of times that of the main cutting, the increase in the overall cutting time is only 2 to 20% of the time for the main cutting.

It will be apparent that many modifications and variations may be effected without departing from the scope of the novel concepts of this invention.

What I claim is:

1. A wire-cut electric discharge machining method for machining along a machining path having a plurality of predetermined sections, in an apparatus having a wire-cut electric discharge machine provided with a high-current short-pulse discharge circuit for producing a high-current, short-pulse discharge for a first cut between a wire and a workpiece, a low-current pulse discharge circuit for producing a low-current pulse discharge for a second cut between the wire and the workpiece, and control means for switching a selected one of the discharge circuits into operation and for controlling the relative movement of the wire and the workpiece, said method comprising the step of:

(a) performing electric discharge machining of a workpiece for a predetermined section of the machining path by (i) machining the first cut using the high-current short-pulse discharge circuit, and
(ii) machining the second cut using a low-current pulse discharge circuit; and (b) repeating step (a) for each of the predetermined sections.

2. A wire-cut electric discharge machining method according to claim 1, wherein the step of performing electric discharge machining comprises the steps of:

including in an NC program an instruction commanding the execution of the second cut, feed rates $f_1$ and $f_2$, cutting conditions $s_1$ and $s_2$ and amounts of offset $d_1$ and $d_2$ for the first and second cuts and wire contouring data for each block;

obtaining, in response to the second cut instruction, a path offset from a commanded wire path of a first block by the amount of offset $d_1$;

moving the wire relative to the workpiece along the path at the feed rate $f_1$ and under the cutting condition $s_1$ to perform the first cut;

obtaining, after the first cut, a point offset from the start point of the commanded path of the first block offset by the amount of offset $d_2$;

moving the wire back to the point with the electric discharge stopped;

obtaining, after moving the wire back to the point, a path offset from the commanded wire path of the first block by the amount of offset $d_2$;

moving the wire relative to the workpiece along the path at the feed rate $f_2$ and under the cutting condition $s_2$ to perform the second cut;

positioning the wire at the first cut end point after the second cut; and performing the first and second cuts along a wire path of a second block in accordance with the foregoing steps.

3. A wire-cut electric discharge machining method according to claim 2, wherein the step of including in an NC program an instruction commanding the execution of the second cut, feed rates $f_1$ and $f_2$, cutting conditions $s_1$ and $s_2$ and amounts of offset $d_1$ and $d_2$ for the first and second cuts and wire contouring data for each block further comprises the step of including the moving-back speed of the wire in the NC program.

4. A wire-cut electric discharge machining method according to claim 2, wherein the step of including in an NC program an instruction commanding the execution of the second cut, feed rates $f_1$ and $f_2$, cutting conditions $s_1$ and $s_2$ and amounts of offset $d_1$ and $d_2$ for the first and second cuts and wire contouring data for each block further comprises the step of including a second cut end instruction in the NC program, and wherein when the second cut end instruction is read out, second-cut control is completed.

5. A wire-cut electric discharge machining method according to claim 1, wherein the step of performing electric discharge machining comprises the steps of:

including in an NC program an instruction commanding the execution of the second cut, feed rates $f_1$ and $f_2$, cutting conditions $s_1$ and $s_2$ and amounts of offset $d_1$ and $d_2$ for the first and second cuts and wire contouring data for each block;

obtaining, in response to the second cut instruction, a path offset from a commanded path of a first block by the amount of offset $d_1$;

moving the wire relative to the workpiece along the path at the feed rate $f_1$ and under the cutting condition $s_1$ to perform the first cut;

obtaining, after the first cut, an offset point offset from the end point of the commanded path of the first block offset by the amount of offset $d_2$ and moving the wire to the offset point at the feed rate $f_2$ and under the cutting condition $s_2$;

obtaining an offset point offset from the start point of the commanded path of the first block by the amount of offset $d_1$ and moving the wire relative to the workpiece to the offset point at the feed rate $f_2$ and under the cutting condition $s_2$ to perform the second cut;

moving the wire forward to the first cut end point, after the second cut, with the electric discharge stopped; and performing the first and second cuts along a path of the next block in accordance with the foregoing steps.

6. A wire-cut electric discharge machining method according to claim 5, wherein the step of including in an NC program an instruction commanding the execution of the second cut, feed rates $f_1$ and $f_2$, cutting conditions $s_1$ and $s_2$ and amounts of offset $d_1$ and $d_2$ for the first and second cuts and wire contouring data for each block further comprises the step of including the wire moving-forward speed after the second cut in the NC program.

7. A wire-cut electric discharge machining method according to claim 5, wherein the step of including in an NC program an instruction commanding the execution of the second cut, feed rates $f_1$ and $f_2$, cutting conditions $s_1$ and $s_2$ and amounts of offset $d_1$ and $d_2$ for the first and second cuts and wire contouring data for each block further comprises the step of including a second cut end instruction in the NC program, and wherein when the second cut end instruction is read out, second-cut control is completed.

8. A wire-cut electric discharge machining method for cutting a workpiece along a predetermined path using a wire-cut electric discharge machine controlled by a numerical control device, said method comprising the steps of:

dividing said predetermined path into a plurality of predetermined segments;

rough-cutting a first segment of said predetermined path by moving the wire of said electric discharge machine with respect to the workpiece while producing a high-current short-pulse discharge between the wire and workpiece;

finish-cutting the first segment of said predetermined path by moving the wire of said electric discharge machine with respect to the workpiece while producing a low-current pulse discharge between the wire and workpiece; and repeating the steps of rough-cutting and finish-cutting for the next segment.

9. The method of claim 8, wherein the step of finish-cutting the first segment comprises the steps of moving the wire with respect to the workpiece to bring the wire back to the point where rough-cutting of the first segment began, offsetting the wire with respect to the workpiece, moving the wire with respect to the workpiece along a path which is offset from the path when the first segment was rough-cut while producing the low-current pulse discharge, terminating the discharge when the wire reaches the end of the first segment, and moving the wire with respect to the workpiece back to the point where rough-cutting of the first segment ended.

10. The method of claim 9, wherein the step of moving the wire with respect to the workpiece to bring the wire back to the point where rough-cutting of the first segment began is conducted faster than the step of rough-cutting the first segment.

11. The method of claim 10, wherein the step of moving the wire with respect to the workpiece along a path which is offset from the path when the first segment was rough-cut is conducted faster than the step of rough-cutting the first segment.

12. The method of claim 8, wherein the step of finish-cutting the first segment comprises the steps of offsetting the wire with respect to the workpiece after the step of rough-cutting the first segment is completed, moving the wire with respect to the workpiece along a path which is offset from the path when the first segment was rough-cut while producing the low-current pulse discharge, terminating the discharge when the wire reaches a position offset from the point at which rough-cutting of the first segment began, moving the wire with respect to the workpiece to bring the wire to the point at which rough-cutting of the first segment began, and moving the wire with respect to the workpiece to return it to the point at which rough-cutting of the first segment ended.

13. The method of claim 12, wherein the step of moving the wire with respect to the workpiece to returning it to the point at which rough-cutting of the first segment ended is conducted faster than the step of rough-cutting the first segment.

14. The method of claim 13, wherein the step of moving the wire with respect to the workpiece along a path which is offset from the path when the first segment was rough-cut is conducted at a speed that is different from the speed of the wire with respect to the workpiece during the step of rough-cutting the first segment.

15. A wire-cut electric discharge machining method for machining along a machining path having a plurality of predetermined sections, in an apparatus having a wire-cut electric discharge machine proved with a high-current short-pulse discharge circuit for producing a high-current, short-pulse discharge for a first cut between a wire and a workpiece, a low-current pulse discharge circuit for producing a low-current pulse discharge for a second cut between the wire and the workpiece, and a control means for switching a selected one of the discharge circuits into operation and for controlling the relative movement of the wire and the workpiece, said method comprising the steps of:

including in an NC program an instruction commanding the execution of the second cut, feed rates $f_1$ and $f_2$, cutting conditions $s_1$ and $s_2$ and amounts of offset $d_1$ and $d_2$ for the first and second cuts and wire contouring data for each block;

obtaining, in response to the second cut instruction, a path offset from a command path of a first block by the amount of offset $d_1$;

moving the wire relative to the workpiece along the commanded path at the feed rate $f_1$ and under the cutting condition $s_1$ to perform the first cut using the high-current short-pulse discharge circuit;

obtaining, after the first cut, a point offset from the start point of the command path of the first block offset by the amount of offset $d_2$;

moving the wire back to the point with the electric discharge stopped;

obtaining, after moving the wire back to the point, a path offset from the commanded path of the first block by the amount of offset $d_2$;

moving the wire relative to the workpiece along the path at the feed rate $f_2$ and under the cutting condition $s_2$ to perform the second cut using the low-current pulse discharge circuit;

positioning the wire at the first cut end point after the second cut; and performing the foregoing steps for each of the predetermined sections.

16. A wire-cut electric discharge machining method for maching along a machining path having a plurality of predetermined sections, in an apparatus having a wire-cut electric discharge machine provided with a high-current short-pulse discharge circuit for producing a high-current, short-pulse discharge for a first cut between a wire and a workpiece, a low current pulse discharge circuit for producing a low-current pulse discharge for a second cut between the wire and the workpiece, and a control means for switching a selected one the discharge circuits into operation and for controlling the relative movement of the wire and the workpiece, said method comprising the steps of:

including in an NC program an instruction commanding the execution of the second cut, feed rates $f_1$ and $f_2$, cutting conditions $s_1$ and $s_2$ and amounts of offset $d_1$ and $d_2$ for the first and second cuts and wire contouring data for each block;

obtaining, in response to the second cut instruction, a path offset from a command path of a first block by the amount of offset $d_1$;

moving the wire relative to the workpiece along the commanded path at the feed rate $f_1$ and under the cutting condition $s_1$ to perform the first cut using the high-current short-pulse discharge circuit;

obtaining, after the first cut, an offset point offset from the end point of the commanded path of the first block offset by the amount of offset $d_2$ and moving the wire to the offset point at the feed rate $f_2$ and under the cutting condition $s_2$;

obtaining an offset point offset from the start point of the commanded path of the first block by the amount of offset $d_1$ and moving the wire relative to the workpiece to the offset point at the feed rate $f_2$ and under the cutting condition $s_2$ to perform the second cut using low-current pulse discharge circuit;

moving the wire forward to the first cut end point, after the second cut, with the electric discharge stopped; and performing the foregoing steps for each of the predetermined sections.

* * * * *

UNITED STATES PATENT AND TRADEMARK OFFICE
CERTIFICATE OF CORRECTION

PATENT NO. : 4,649,252

DATED : March 10, 1987

INVENTOR(S) : Obara

It is certified that error appears in the above-identified patent and that said Letters Patent is hereby corrected as shown below:

Col. 2, line 46, "$V_1$" should be --$V_\ell$--;

line 47, "$R_1$" should be --$R_\ell$--; and

"$Q_1$" should be --$Q_\ell$--;

line 49, "$C_1$" should be --$C_\ell$--; and

"$D_1$" should be --$D_\ell$--;

line 51, "$G_1$" should be --$G_\ell$--;

line 58, "$V_1$" should be --$V_\ell$--; and

"$R_1$" should be --$R_\ell$--;

line 59, "$C_1$" should be --$C_\ell$--;

"$D_1$ and" should be --$D_\ell$ and--; and

"$Q_1$" should be --$Q_\ell$--.

Col. 3, line 2, "$Q_1$," should be --$Q_\ell$,--;

line 4, "$G_1$" should be --$G_\ell$--;

line 17, "$1_1$" should be --$\ell_1$--;

line 18, "$1_2$" should be --$\ell_2$--;

UNITED STATES PATENT AND TRADEMARK OFFICE
CERTIFICATE OF CORRECTION

PATENT NO. : 4,649,252
DATED : March 10, 1987
INVENTOR(S) : Obara

It is certified that error appears in the above-identified patent and that said Letters Patent is hereby corrected as shown below:

|  |  |
|---|---|
|  | line 34, "$l_1$" should be --$\ell_1$--; |
|  | line 38, "$l_1$" should be --$\ell_1$--; |
| Col. 3, | line 45, "$G_1$" should be --$G_\ell$--. |
| Col. 4, | line 3 of the formula, "G01X" should be --G01 X--. |
| Col. 6, | line 48, "movingback" should be --moving-back--. |
| Col. 8, | line 25, "$l_1$" should be --$\ell_1$--; |
|  | line 62, after "and" insert --a--. |

Signed and Sealed this

Eighth Day of September, 1987

Attest:

DONALD J. QUIGG

*Attesting Officer*     *Commissioner of Patents and Trademarks*